(12) United States Patent
Dolinina et al.

(10) Patent No.: US 9,218,269 B2
(45) Date of Patent: Dec. 22, 2015

(54) TESTING MULTIPLE TARGET PLATFORMS

(75) Inventors: Elena Dolinina, Kfar Saba (IL); Lukas Bednar, Hlinsko (CZ)

(73) Assignee: Red Hat Israel, Ltd., Raanana (IL)

( * ) Notice: Subject to any disclaimer, the term of this patent is extended or adjusted under 35 U.S.C. 154(b) by 168 days.

(21) Appl. No.: 13/606,984

(22) Filed: Sep. 7, 2012

(65) Prior Publication Data

US 2014/0075242 A1    Mar. 13, 2014

(51) Int. Cl.
  *G06F 11/00* (2006.01)
  *G06F 11/36* (2006.01)
(52) U.S. Cl.
  CPC ........ *G06F 11/3672* (2013.01); *G06F 11/3664* (2013.01); *G06F 11/3688* (2013.01)
(58) Field of Classification Search
  CPC .............. G06F 11/2294; G06F 11/263; G06F 11/2635; G06F 11/3664; G06F 11/3688; G06F 11/3696
  USPC ................................................. 714/32, 33, 25
  See application file for complete search history.

(56) References Cited

U.S. PATENT DOCUMENTS

| | | | | |
|---|---|---|---|---|
| 7,421,621 B1 * | 9/2008 | Zambrana | ................... | 714/38.14 |
| 8,464,219 B1 * | 6/2013 | Wilkerson | ..................... | 717/120 |
| 8,719,788 B2 * | 5/2014 | Merry | ........................... | 717/124 |
| 8,924,791 B2 * | 12/2014 | Gao et al. | .................... | 714/38.14 |
| 8,959,000 B2 * | 2/2015 | Kumar et al. | ................. | 702/119 |
| 8,959,485 B2 * | 2/2015 | Kvartskhava et al. | ........ | 717/124 |
| 9,015,654 B2 * | 4/2015 | Kaasila et al. | ................. | 717/106 |
| 2002/0162059 A1 * | 10/2002 | McNeely et al. | ............. | 714/703 |
| 2003/0140138 A1 * | 7/2003 | Dygon et al. | ................. | 709/224 |
| 2004/0107415 A1 * | 6/2004 | Melamed et al. | ............. | 717/124 |
| 2004/0243381 A1 * | 12/2004 | Kuturianu et al. | .............. | 703/22 |
| 2004/0260982 A1 * | 12/2004 | Bhowmik et al. | ............... | 714/43 |
| 2005/0188262 A1 * | 8/2005 | Rosenman et al. | ............. | 714/25 |
| 2007/0061625 A1 * | 3/2007 | Acosta et al. | ................... | 714/38 |
| 2008/0010535 A1 * | 1/2008 | Dasgupta | ........................ | 714/38 |
| 2008/0120521 A1 * | 5/2008 | Poisson et al. | .................. | 714/26 |
| 2009/0300423 A1 * | 12/2009 | Ferris | .............................. | 714/38 |
| 2010/0100872 A1 * | 4/2010 | Mitra | ............................ | 717/125 |
| 2011/0307860 A1 * | 12/2011 | Park et al. | ..................... | 717/107 |
| 2013/0042222 A1 | 2/2013 | Maddela | | |
| 2013/0086558 A1 * | 4/2013 | Merino et al. | ................ | 717/128 |
| 2014/0033177 A1 * | 1/2014 | Chang et al. | .................. | 717/124 |
| 2014/0059385 A1 * | 2/2014 | Dolinsky et al. | ................ | 714/33 |
| 2015/0007135 A1 * | 1/2015 | Suttle et al. | .................... | 717/121 |

OTHER PUBLICATIONS

Greenfield et al., Software Factories: Assembling Applications with Patterns, Models, Frameworks and Tools, OOPSLA 2003, p. 16-27.

* cited by examiner

*Primary Examiner* — Marc Duncan
(74) *Attorney, Agent, or Firm* — Lowenstein Sandler LLP (57) ABSTRACT

An automated REpresentational State Transfer (REST) testing tool receives a file representing a set of tests to run on a target test platform and identifies a type of the file. Then the testing tool parses the file based on the type to extract test parameters, and performs test actions on the target test platform based on the test parameters.

17 Claims, 9 Drawing Sheets

FIG. 1

| | test name | test action | parameters | positive | run |
|---|---|---|---|---|---|
| 1 | | | n/a2 | n/a3 | |
| 2 | START_GROUP Create remove data center | n/a1 | | | |
| 3 | Add data center '{data_center_type}' | addDataCenter | name='{data_center_type}StorageTest',storage_type='{data_center_type}' | TRUE | yes |
| 4 | Add cluster '{data_center_type}' | addCluster | name='{data_center_type}StorageTest', cpu='{cpu_name}', data_center='{data_center_type}' | TRUE | yes |
| 5 | Add hosts '{data_center_type}' | addHost | name='{vds}',root_password='{vds_password}',cluster='{data_center_type}' | TRUE | loop({vds},{vds_password}) |
| 6 | Wait for all hosts are UP '{data_center_type}' | waitForHostsStates | names='{vds}' | TRUE | YES |
| 7 | iscsi discover | iscsiDiscover | host='{vds[0]}',address='{lun_address}' | TRUE | if({data_center_type}==e{storage_ty |
| 8 | iscsi login | iscsiLogin | host='{vds[0]}',address='{lun_address}',target='{lun_target}' | TRUE | if({data_center_type}==e{storage_ty |
| 9 | create data domain NFS | addStorageDomain | name='{data_center_type}StorageTest_data_domain_#loop_index',type='e{storage_dom_type_data}',storage_type='e{storage_type_nfs}',address='... | TRUE | if({data_center_type}==e{storage_ty |
| 10 | create data domain iSCSI | addStorageDomain | name='{data_center_type}StorageTest_data_domain_#loop_index',type='e{storage_dom_type_data}',storage_type='e{storage_type_iscsi}',host='... | TRUE | if({data_center_type}==e{storage_ty |
| 11 | create data domain FCP | addStorageDomain | name='{data_center_type}StorageTest_data_domain_#loop_index',type='e{storage_dom_type_data}',storage_type='e{storage_type_fcp}',host='{v | TRUE | if({data_center_type}==e{storage_ty |
| 12 | Create iso domain for '{data_center_type}' | addStorageDomain | ... path='{tests_iso_domain_path}' | TRUE | yes |
| 13 | attach data Storage domain to data center NFS | attachStorageDomain | datacenter='{data_center_type}StorageTest',storagedomain='{data_cen | TRUE | if({data_center_type}==e{storage_ty |
| 14 | END_GROUP Create remove data center | | | | |
| 15 | START_GROUP Change domain state | | n/a2 | n/a3 | |
| 17 | iscsi discover | iscsiDiscover | host='{vds[0]}',address='{extend_lun_address}' | TRUE | if(({extend_lun} is not 'None') and (( |
| 18 | iscsi login | iscsiLogin | host='{vds[0]}',address='{extend_lun_address}',target='{extend_lun_targ | TRUE | if(({extend_lun} is not 'None') and (( |
| 19 | extend storage domain iSCSI | extendStorageDomain | target,lun_port='3260',host='{vds[0]}',storage_type='e{storage_type_iscsi}' | TRUE | if(({extend_lun} is not 'None') and ((|
| 20 | extend storage domain FCP | extendStorageDomain | extend_lun}',host='{vds[0]}', storage_type='e{storage_type_fcp}' | TRUE | ({data_center_type}==e{storage_typ |
| 21 | Validate storage data NFS | validateEntityStatus | x', expectedStatus='e{storage_domain_state_active}', dcName='{data_center_type}StorageTest' | TRUE | if({data_center_type}==e{storage_ty |
| 22 | Validate storage data iSCSI/FCP | validateEntityStatus | x', expectedStatus='e{storage_domain_state_active}', dcName='{data_center_type}StorageTest' | TRUE | if({data_center_type}==e{storage_ty |
| 23 | Validate storage ISO of '{data_center_type}' | validateEntityStatus | expectedStatus='e{storage_domain_state_active}', dcName='{data_center_type}StorageTest' | TRUE | yes |
| 24 | Deactivate Non Master Domains '{data_center_type}' | execOnNonMasterDomains | datacenter='{data_center_type}StorageTest',operation='deactivate',type='all' | TRUE | yes |
| 25 | Detach Non Master Domains '{data_center_type}' | execOnNonMasterDomains | datacenter='{data_center_type}StorageTest',operation='detach',type='all' | TRUE | yes |

| # | Test name | Test action | Parameters | Positive | Run | Report | Fetch output |
|---|---|---|---|---|---|---|---|
| 1 | START_GROUP:Setup | | | NONE | | | |
| 2 | Convert Os name to Os type element | convertOsName | osName='{vm_os}' | TRUE | YES | NO | osTypeElement->osTypeEleme |
| 3 | Create VM linux and nfs storage | createVm | vmName='testVm',vmDescription="TestVM',clust| | TRUE | NO | YES | |
| 4 | Create VM windows and nfs storage | createVm | vmName='testVm',vmDescription="TestVM',clust| | TRUE | NO | YES | |
| 5 | Create VM linux and iscsi storage | createVm | vmName='testVm',vmDescription="TestVM',clust| | TRUE | NO | YES | |
| 6 | Create VM windows and iscsi storage | createVm | vmName="testVm',vmDescription="TestVM',clust| | TRUE | NO | YES | |
| 7 | END_GROUP:Setup | | | NONE | | | |
| 8 | START_GROUP:Test Suite | | | NONE | loop({vm_name}) | | |
| 9 | Run CPU load on VM for amount of time | runLoadOnGues| | vmName='{vm_name}',osType='{os_type}',user| | TRUE | YES | YES | |
| 10 | Run memory load on VM for amount of tim| | runLoadOnGues| | vmName='{vm_name}',osType='{os_type}',user| | TRUE | YES | YES | |
| 11 | Run IO load on VM for amount of time | runLoadOnGues| | vmName='{vm_name}',osType='{os_type}',user| | TRUE | YES | YES | |
| 12 | END_GROUP:Test Suite | | | NONE | | | |
| 13 | START_GROUP:Cleanup | | | NONE | ifaction(testRunFinished) | | |

TESTING MULTIPLE TARGET PLATFORMS

TECHNICAL FIELD

Embodiments of the present invention relate to testing Representational State Transfer (REST) Application Programming Interfaces (APIs), and more specifically to automated testing of different products with different REST API formats.

BACKGROUND

Many software applications and computing platforms make use of Representational State Transfer (REST) Application Programming Interfaces (APIs). REST refers to a particular architectural style and particular interfaces for clients and servers. Clients and servers have a uniform interface in which individual clients and servers are replaceable as long as the interface remains unchanged. Further, communication between REST clients and servers is stateless and cacheable. The REST style of client and server architecture can include other attributes, as well. Automated testing tools can perform functional testing and regression testing on such software applications via REST APIs. However different products, while each conforming to the REST architectural style, can be incompatible between each other, such as due to different APIs, different available states, or different communication protocols.

Thus, in order to perform functional or regression testing to such different RESTful platforms, completely separate tests are created manually for each RESTful platform.

BRIEF DESCRIPTION OF THE DRAWINGS

The present invention is illustrated by way of example, and not by way of limitation, in the figures of the accompanying drawings and in which:

FIG. 5 illustrates an example main user interface for a test composer.

FIG. 8 illustrates an example test coverage report.

DETAILED DESCRIPTION

Described herein is a system, a method and apparatus for a generic automated testing tool which allows testing of multiple different products via their respective REST APIs. The example generic automated testing tool can accept input in multiple formats, such as XML, a Python script, structured text, or a spreadsheet in a format such as OpenDocument Spreadsheet (ODS) format. The automated testing tool can parse and import data from these various input types to determine which tests to run for a particular target test product. Then, the automated testing tool can execute the tests for the desired target test products, and validate responses from the target test product. The automated testing tool can also generate XML and JUnit test results. The automated testing tool can perform simultaneous parallel testing of multiple target test products or of multiple aspects of a single target test product. Further, the automated testing tool can incorporate plug-ins, via a plug-in management subsystem, for providing additional functionality, such as importing different input file types, or executing tests on different platforms via their respective REST APIs. Besides providing the ability to import and export to different platforms, plug-ins can also provide other functionality for the automated testing tool, such as cleanup after running a test, interfacing with a bug tracker, logging events occurring while running tests, and so forth.

Figure 1:
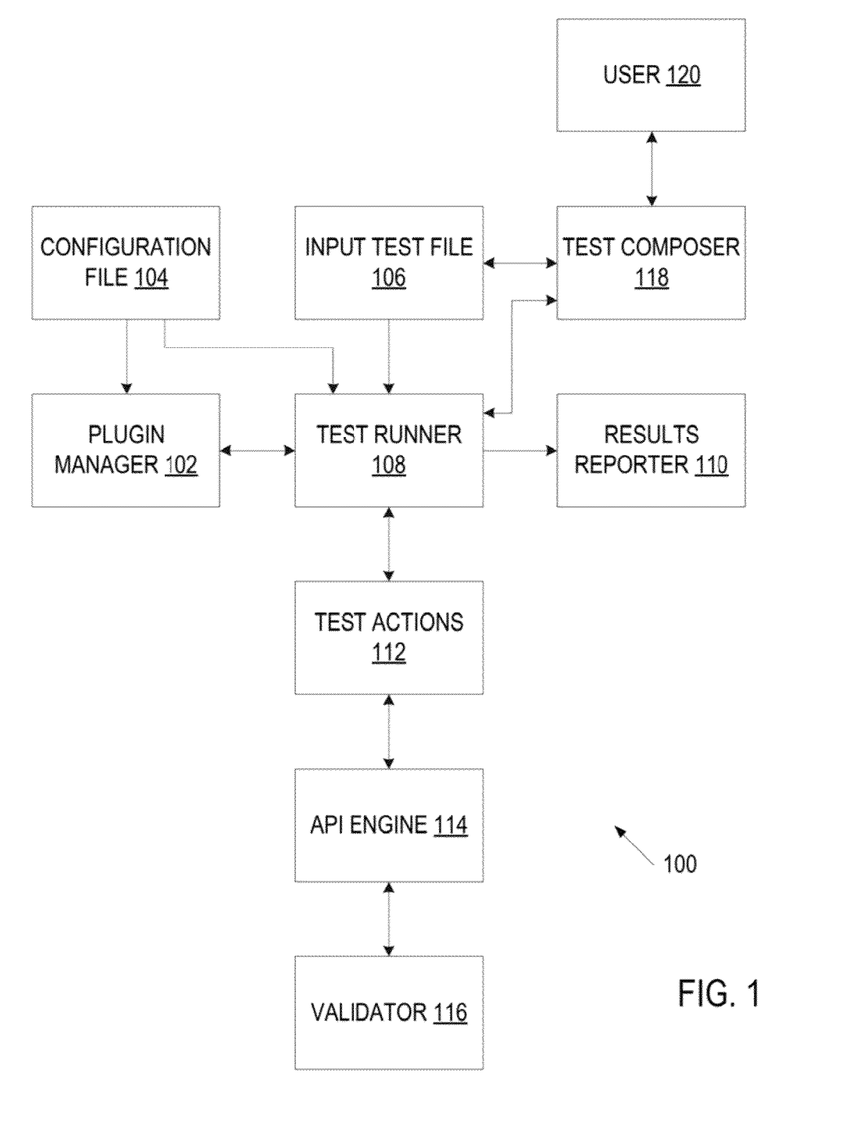
FIG. 1 illustrates a block diagram of an example architecture for automated REST testing.

FIG. 1 illustrates a block diagram of an example architecture 100 for performing automated REST testing. A user 120 uses a test composer 118 to create, edit, or otherwise modify an input test file 106 that indicates one or more test actions to perform, as well as parameters for the test actions. For example, the input test file 106 can include a first test action for mounting a virtual storage device where the parameters define which virtual storage device to mount and how to mount it, a second test action for reading a file stored in the mounted virtual storage device where the parameters define which file to read and where within the file to seek to, and a third test action for executing a command on the target test platform based on data read from the file where the parameters define which user credentials to use when executing the command. The input test file 106 can be stored as XML, ODS, a Python script, or in some other format. The input test file 106 can be a single file or a collection of files. The test composer 118 can provide the input test file 106 to a test runner 108, or can communicate with the test runner 108 to provide instructions for running automated tests. The test runner 108 accepts as input the input test file 106 or equivalent input data, and a configuration file 104.

Figure 2:
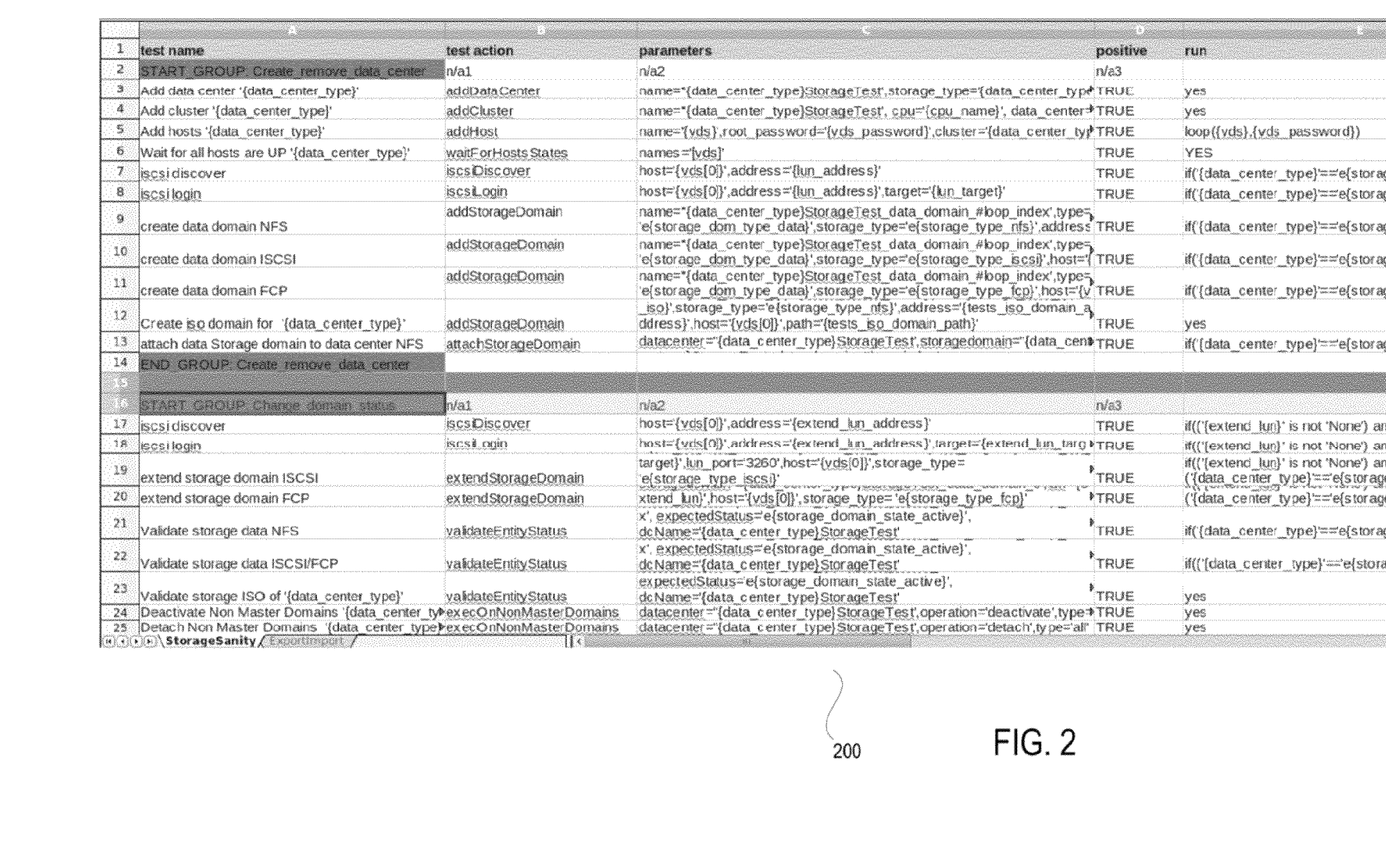
FIG. 2 illustrates an example test scenario represented as an input spreadsheet file.

FIG. 2 illustrates an example test scenario represented as a spreadsheet 200 representing input test file 106. The spreadsheet 200 defines column headers such as test_name, test_action, parameters, positive, run, report, and so forth. Individual column headers can be mandatory or optional for specific test types. The column headers define different test attributes, and rows in the spreadsheet represent individual tests. For example, the spreadsheet 200 illustrates a set of actions that are executed in a particular order as part of a test on the target system. In this example, row 3 indicates an action and parameters for adding a data center to be tested, and row 8 indicates an action and parameters for logging in to the data center with a particular set of credentials. A data center to be tested may include clusters of computing devices where each cluster can be a group of computing devices which are connected via one or more networks, and which can cooperate to perform computing tasks. A user can access all or part of a cluster as a single entity without accessing individual computing devices that make up the cluster. Clusters can be administered or controlled via a master computing node, or can include computing devices which are peers without such a master computing node. Each computing device may be a host machine running one or more virtual machines. The data center may also include multiple storage domains. A storage domain is a set of storage devices available to a specific cluster. The storage domain can include local disks of various computing devices, as well as a dedicated storage device, such as a network attached storage (NAS) device.

Figure 3:
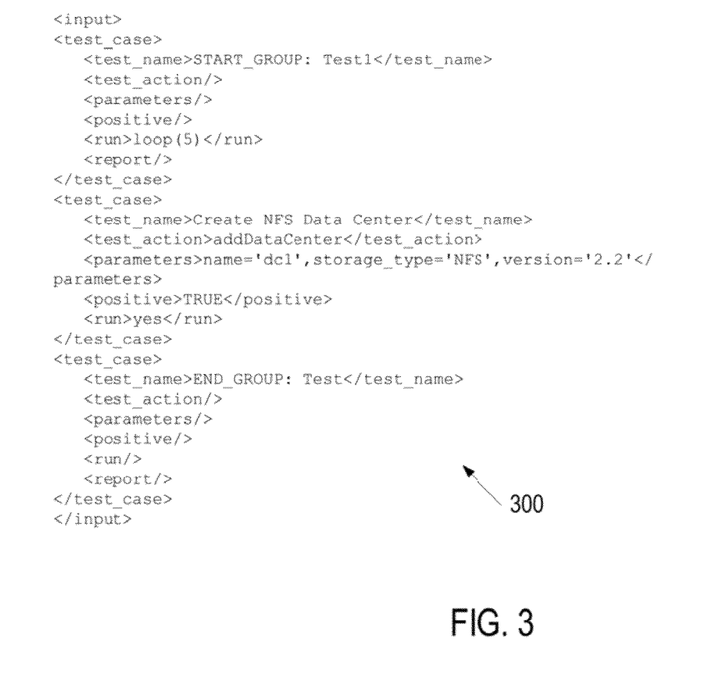
FIG. 3 illustrates an example test scenario represented as an input XML file.
Figure 4:
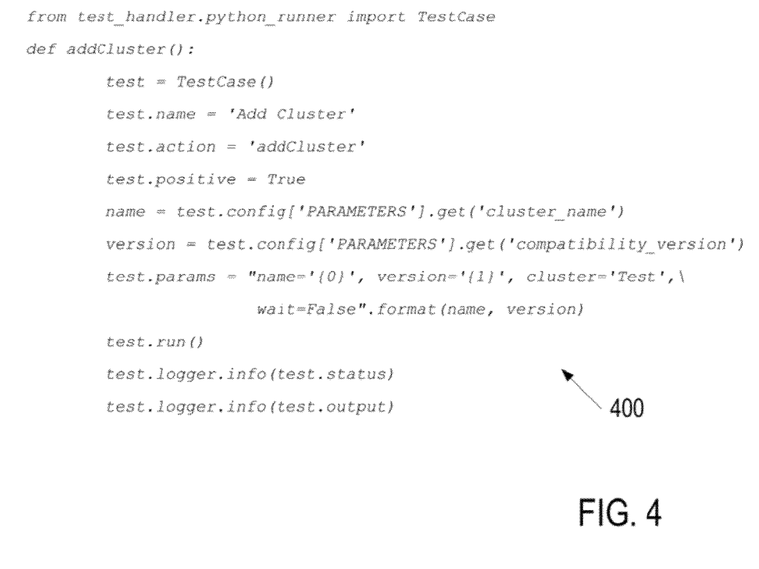
FIG. 4 illustrates an example test scenario represented as an input Python script file.

The spreadsheet 200 also illustrates that multiple actions can be grouped, such as rows 3-13 which are grouped to create a data center for testing. So a user can easily create a new test case by adding a new row to the spreadsheet and filling in each cell corresponding to that row. FIG. 3 illustrates an example test scenario represented as an XML 300 representing input test file 106. Instead of rows and columns like the spreadsheet, the XML file 300 represents information in XML tags. FIG. 4 illustrates an example test scenario represented as an input Python script file. The same information can be conveyed to the test runner 108 in any of these file formats or in other file formats. These three file formats are provided as illustrative examples.

Returning to FIG. 1, the configuration file 104 can provide for the test runner 108 various system-wide settings that are beyond the scope of the input test file. For example, the configuration file 104 can specify for the test runner 108 whether and what to log, parameters for connecting to a command line interface, login credentials for performing the tests, cryptographic tokens, host names, local or network paths to specific resources used for testing, debugging information, flags or conditions for skipping certain tests, addresses of host machines associated with performing tests, and so forth. The configuration file 104 can include instructions for various plug-ins in a plug-in manager 102 as well. Plug-ins provide instructions for adapting communications with for different platforms using a common testing engine. In this way the testing engine or other components disclosed herein can be used with multiple different target testing platforms or according to different communication or markup standards. The plug-in manager manages the plug-ins, such as determining which plug-ins are available, installing new plug-ins, removing plug-ins, selecting which plug-in or plug-ins to use for a particular test or test action, and so forth. The plug-in manager can maintain multiple plug-ins for different versions of a same communication protocol to increase cross-version compatibility. The configuration file 104 can provide multiple different sets of configurations for simultaneous use.

The configuration file 104 can further specify a test engine to use for a particular test. For example, if several REST based test engines are supported and available, the test runner 108 can switch between the engines by loading an appropriate configuration file with a different test engine parameter. The configuration file 104 can indicate specific portions of an input file to process when performing a test, such as specific sheets or cell ranges in a spreadsheet, specific line numbers or tags in an XML file, or a specific group of tests. In this way, a single input file can contain a listing of test actions for multiple different scenarios and only a desired subset of the test actions in the input file can be performed. The configuration file 104 can indicate whether to enable a debug mode, whether to perform certain tests in parallel, a path to an XML schema document, and so forth. In some embodiments, the configuration file 104 provides some configuration information which is overridden by other configuration information in the input test file 106.

The configuration file 104 can include multiple sections, such as a [RUN] section, a [REST_CONNECTION] section, a [PARAMETERS] section, and a [REPORT] section. The [RUN] section provides configuration data for how to execute tests. An example [RUN] section of a simple configuration file 104 is provided below:

```
[RUN]
engine = rest
tests_file = /tmp/rest.xml
data_struct_mod = data_struct.data_structures
api_xsd = /data_struct/api.xsd
debug = yes
media_type = application/xml
```

An example of the [RUN] section in the same XML file running parallel with different configuration files is provided below:

```
[RUN]
tests_file = /tmp/test.xml, /tmp/test.xml
in_parallel=/tmp/test.xml, /tmp/test.xml # same or different xml files can be set here
parallel_configs = conf/settings.conf, conf/settings2.conf # paths to config files, if omitted - default config is set
```

The [REST_CONNECTION] section can include parameters such as scheme for defining whether to communicate with the test platform via HTTP or HTTPS, host which indicates the user's REST client machine, port which defines which port the REST API communicates on, entry_point which defines a main URL suffix for the REST API such as <host>:<port>/api/entry_point=api, user which defines a user name for logging in to the REST API client, user_domain, and other parameters relating to establishing the REST connection.

The [PARAMETERS] section defines global parameters used by the test. These global parameters are optional and can be removed or extended depending on a specific test scenario definition. Any of these parameters can be a single value or a list of values. In one embodiment, the [PARAMETERS] section includes customized sections for parallel testing. The test runner 108 can run the same test file 106 in parallel with different parameters from one configuration file. The test runner 108 can use new configuration sections with required parameters for each of the parallel threads for parallel tests. A simplified configuration file 104 for parallel tests is provided below:

```
[RUN]
tests_file = /tmp/test.xml,/tmp/test.xml
in_parallel=/tmp/test.xml,/tmp/test.xml
parallel_sections = test1, test2
...
[TEST1]
name=test1
[TEST2]
name=test2
```

The [REPORT] section of the configuration file 104 defines parameters required for tests results reporting. For example, the [REPORT] section can include a has_sub_tests parameter marked 'yes' if each test should be reported as a sub-test of its group/testing module, and marked 'no' if each test should be reported independently. The [REPORT] section can include an add_report_nodes parameter listing node names if additional nodes besides the default ones, as defined in input XML nodes, should be added to report, or marked 'no' otherwise. For example, additional nodes may be added for benchmark tests including, but not limited to, response time for an action, a corresponding load on the CPU and memory, or any other applicable benchmark criteria. The configuration file can indicate added nodes by "add_report_nodes=version, name." If the user wants to add additional nodes to the report, the function used in the test scenario should return these properties in its output dictionary.

FIG. 8 illustrates an example test coverage report 800. This report is one example of what information the results reporter 110 can track and what kind of report the results reporter 110 can generate. The results reporter 110 can track which lines 802 and branches 804 of code in a target test platform that the tests cover, and provide that information to a user via a tool (e.g., Cobertura), which may be enabled by a plug-in, whether in a post-test report or dynamically as the tests are ongoing. In this example test coverage report, the packages are sorted by the branch coverage column 804, but could alternatively be sorted alphabetically or by the line coverage column 802, for example. The user can save or export the test coverage report 800.

Returning again to FIG. 1, the test runner 108 processes the input test file 106 according to the configuration file 104 and optionally using a plug-in from the plug-in manager 102 to generate test actions 112. The input test file 106 defines the test scenario. Depending on the file format of the input test file 106, each test case in the input file contains certain attributes. For example, an XML input test file 106 includes XML nodes, an ODS input test file includes columns and rows, and a Python script input test file 106 includes TestCase object attributes.

A test_name attribute in the input file indicates the name of the test which will appear in reports. A test_action attribute in the input file indicates an action which will run to implement the test. Each action can be mapped to a function defined in the configuration file 104, for example. Parameters attributes read from the input test file 106 are used to construct or execute the test. Parameter names should correspond to the names of test function parameters. The user can use parameter names from the configuration file as place holders. For example, if the user puts the parameter name in { } brackets in the configuration file, the test runner 108 will replace the parameter name with the relevant value at run time. If the user desires product constants from the configuration file, the user can enter the string e{param_name}. When the test runner 108 encounters a list, such as a comma separated list, in the configuration file, the test runner can fetch the corresponding value via array indexing, such as {name_of_param[param_index]}. The test runner 108 can obtain the list as a string by using [name_of_param], such as when a user requests to view all or part of the list. When using a loop in the 'run' column, see below, the user can concatenate the loop iteration index to any of the parameters. Some example parameter values are provided below:

Get parameter 'compatibility version' from settings configuration file
name='Test1',version='{compatibility version}'
Get parameter 'storage_type_nfs' from enums configuration file
name='Test1',storage_type='e{storage_type_nfs}'
Get first parameter from list of 'vm_names' from settings
name='{vm_names[0]}'
Get list of 'vm_names' Names As a String From settings
name='[vm_names]'
Add iteration index to name when running in a loop
name='testVM#loop_index'

The user can set 'positive—mandatory' to TRUE if the test should succeed, FALSE if the test should not succeed, or NONE if the function should not use this parameter at all. The user can set 'run—mandatory' to TRUE if the test should be run, or 'no' if the test should not be run. In one embodiment, the user can specify a Python condition here, such as if(<condition>). However, the user can also incorporate more complex Python conditions here as well. For example, the user can specify ifaction(<action_name>, <action parameters>), in which the test will run if the action returns TRUE. On the other hand, the user can specify not ifaction(<action_name>, <action parameters>), in which the test will run if the action returns FALSE.

In addition to conditions, the user can include loops and forks in the input test file 106. A loop can be used to make zero or more of a same operation. A loop performs iterations one after another, but a fork executes at least some of the iterations simultaneously. Both loops and forks can be used with groups so the contents of the group is executed several times and in a particular order. Examples of the syntax for specifying loops and forks are provided below:

```
loop(<number_of_iterations>)
loop(<iterations_range>)
loop({<parameter_name_to_iterate_on>})
forkfor(<number_of_iterations>)
forkfor(<iterations_range>)
forkfor({<parameter_name_to_iterate_on>})
```

Examples of conditional statements and loops used together are provided below:

```
if(<condition>);loop(<number_of_iterations>)
Simple condition:
    if('{compatibility_version}'=='2.3')
        if(len({hosts})>2)  # will run if number of
values    in 'hosts' parameter in configuration file is greater than 2
    Action conditions:
    ifaction(activateHost,'TRUE',name='{host}')
    not ifaction(activateHost,'TRUE',name='{host}')
    Loop statements
            loop(5) loop(5-10) loop({os_name})
    'if' and 'loop' together:
            if('{compatibility_version}'=='2.3');loop(5)
```

The input test file can iterate over several parameters at once, which can be useful to speed up host installation, for example. As a specific example, if the user desires to install several hosts which all have different passwords, the user can define the following parameters in the configuration file 104:
hosts=host1, host2, host3
password=pass1, pass2, pass3
Then in the input test file 106, the user can enter the following in 'parameters' field:
host={host}, password={password}
and enter the following in 'run' field:
loop({host}, {password})
The test will run three times, and each time the required action will be run with the hostname and password relevant to the current iteration.

The input test file 106 can include a report parameter with a default value of TRUE. If the report parameter is TRUE, then the results reporter 110 generates test results, such as in a results.xml file. If the report parameter is FALSE, then the results reporter 110 does nothing for the particular test, or generates results but does not report them. The results reporter 110 can write events in a log file, such as a start time and end time of the event, a test status, an iteration number such as if the event occurs in a loop, as well as all parameters from the input test file 106 associated with the event.

If the test function returns some value, such as a value that will be used as input for further tests, the user can store it using a fetch_output parameter. The function can return additional values besides status in dictionary format. The user can specify the key name related to the desired output value, and a parameter name for where to store the desired output value. Thus, the format of this value should be the following:

```
Generic Example:
    <fetch_output_from_key_name>->
    <fetch_output_to_parameter_name>
Specific Example:
    osName->myOsName
```

The input test file 106 can group tests into test sets. The input test file 106 can group tests according to their functionality, flows, testing purpose, permissions, execution time, dependencies on output from other tests, and so forth. To define a custom group in input file, a user can add a new test case before the tests that should be grouped, as shown below:
    test_name=START_GROUP: <name_of_tests_group>
The 'run' parameter can instruct the test runner to run the whole group of tests in a loop or by certain condition. To mark where the test group is finished, the user can add a new test case after the last test of the group as shown below:
    test_name=END_GROUP:<name_of_tests_group>
The name of the test group here should be the same as specified in START_GROUP value.

Figure 7:
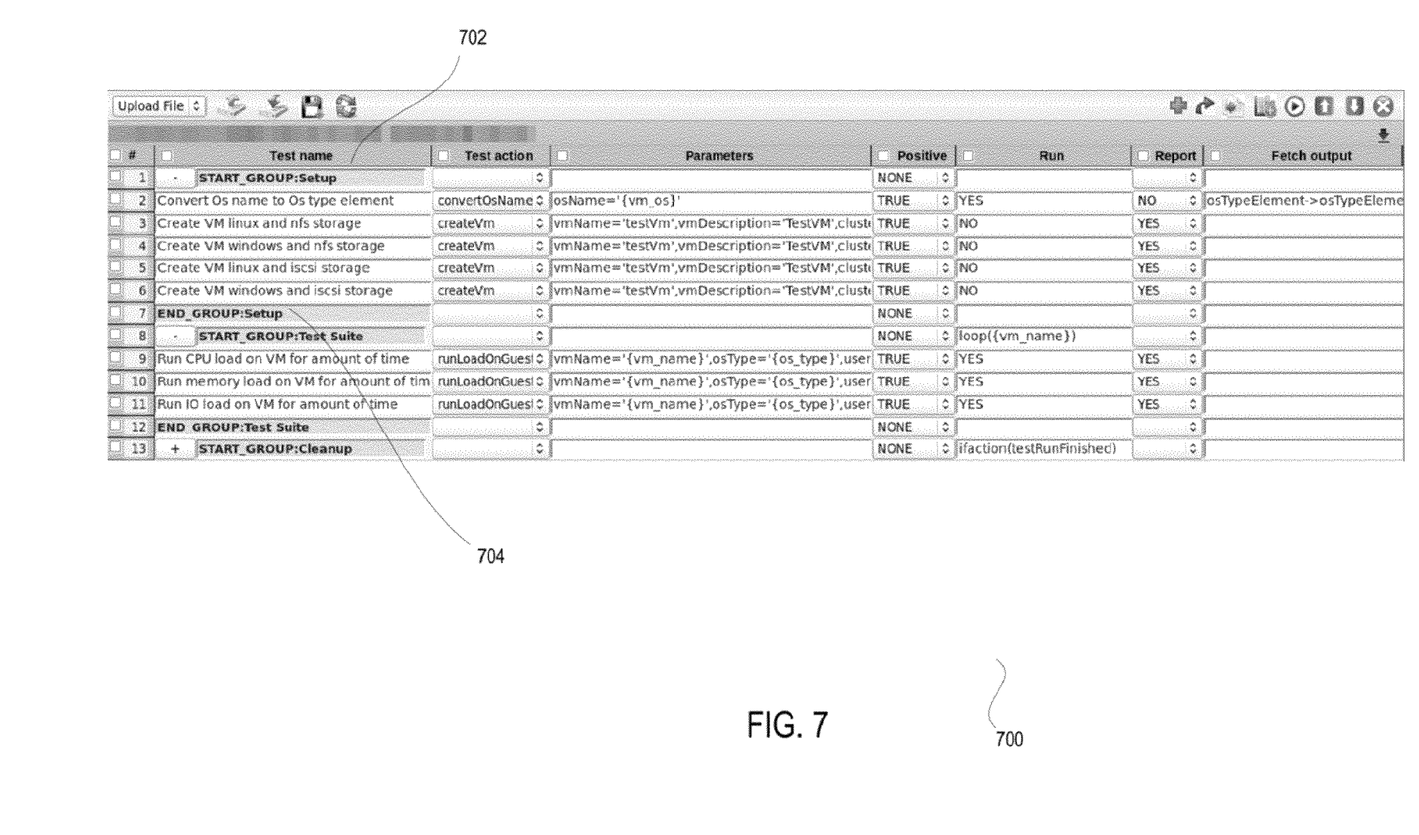
FIG. 7 illustrates an example user interface for specifying groups of logical test sets in the test composer.

FIG. 7 illustrates an example user interface 700 for specifying groups of logical test sets in the test composer 118. For example, one set of test actions can be grouped to load and start a virtual machine, such as individual actions for initializing a virtualization environment, loading a virtual machine and a virtual disk, and booting the virtual machine. Another set of test actions can be grouped to start a web server on the virtual machine, such as actions and parameters for starting an httpd daemon and for enabling network communications. Any set of test actions can be combined together as a group to enable simplified reuse of the test actions as a group.

The user can insert a START_GROUP cell 702 and an END_GROUP cell 704 that define the boundaries of the group, so that the test runner 108 treats tests between the START_GROUP cell 702 and the END_GROUP cell 704 as a group. The test runner 108 executes or causes to be executed test actions 112 on the target test platform via a REST based engine, such as an API, a command line interface (CLI), or a software development kit (SDK). The test runner 108 can send all types of REST API requests, such as GET, PUT, POST, DELETE, TRACE, or CONNECT. The test runner 108 can receive feedback regarding the progress, success, failure, or other status of tests, which a results reporter 110 can output to a user. The results reporter 110 can report results via active messages, such as a pop-up in a graphical user interface, via email or text message, via an entry in a log, and so forth. The results reporter 110 can generate nested reports containing results of sub-tests. The results reporter 110 can also generate a single report summarizing the results of the test actions 112 for a particular product, product category, feature, test suite, unit test, and so forth. The test runner 108 can simultaneously execute multiple sets of test actions 112, which can be for the same API engine 114 or a set of different test interfaces.

Before executing the test actions 112 indicated by the input test file 106, the test runner can compile the input test file 106 to validate the input test file 106 or to check for errors. If the test runner 108 encounters any errors, the test runner 108 can generate an error message for display to the user, such as via a debugging console.

While the test runner 108 can simultaneously execute test actions 112, some test actions 112 can depend on the output of other test actions 112. Thus, the test runner 108 can fetch output from one test action or group of test actions for use when starting another test action. The test runner 108 can execute test actions 112 in groups or test sets, and can run test actions 112 in loops and using conditional statements and branching.

In one embodiment, the test runner 108 builds Python data structures based on an XML schema document. The data structures represent the elements described by the XML schema document. The test runner 108 can incorporate a parser that loads data in an XML document into data structures for use with testing, and can transform data from the data structures back into an XML document. The test runner 108 can map all test functions to a known action in a configuration file. Then the test runner 108 can access the actions from the input test file 106.

Figure 6:
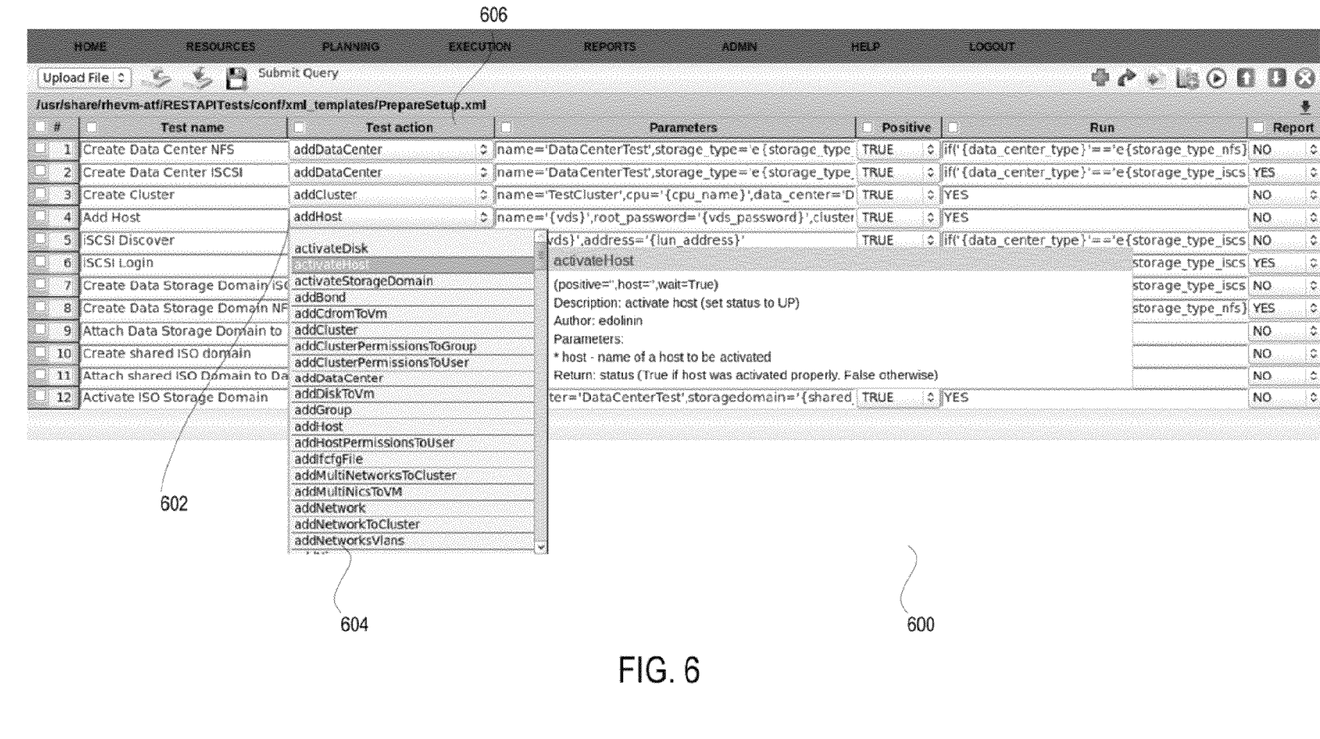
FIG. 6 illustrates an example user interface for selecting an action in the test composer.

Returning to the test composer 118, FIGS. 5 and 6 illustrate various example user interfaces for the test composer 118. The test composer provides a user interface for simple and accurate creation and management of automated tests. Users can create, edit, and otherwise manage parts of automated testing suites via a graphical user interface instead of manually creating or editing an XML or other type of automated testing input file. The typical automated test platform accepts very specific input providing details of what types of tests to run, what input data to use, which commands to execute, an order of commands, and any other testing parameters. The input to the automated test platform may also specify which testing outputs to track for logging purposes. A test composer allows users who may be unfamiliar with the specific automated test platform language, form, or commands to create and manage automated tests in a more familiar graphical environment and without knowledge of the language used to control the test platform, such as XML. Further, the graphical environment can provide suggestions, such as lists of available testing options, so that users can easily access functionality of the test platform. A graphical user interface approach to managing automated testing allows for increased efficiency and accuracy of testing, and makes automated testing accessible to a wider audience of users beyond those who are technically knowledgeable in the specific language and details of the test platform.

The example test composer 118 can provide a graphical user interface in which the user provides keyboard and mouse input, or a voice interface in which the user provides spoken input. The test composer 118 can include a file I/O module for retrieving and storing files, such as other configuration or preferences files for the test composer. The test composer 118 can use test templates to populate tests in the user interface using common settings or common lists of available options. The test composer 118 can further include an XML formatting database that specifies XML formats for target test platforms. The test composer 118 can also include a test automator interface for communicating with test platforms directly or for communicating with a test automator which performs tests on the test platform. The test automator interface can communicate with test platforms such as by sending commands to the test platform via a network connection, by sending XML files to the test platform, or by publishing commands for a test platform on a test feed. The test automator interface can communicate with different test platforms using different protocols or different communication channels.

FIG. 5 illustrates an example main user interface 500 for the test composer 118. The test composer 118 can build a tests matrix based on a testing framework. The test composer 118 can start with an XML, ODS, Python, or other file type. The user uploads or selects the appropriate file in the test composer interface via an 'Upload File' button 502. The test composer 118 loads the information from the uploaded file into the user interface, which is depicted here as a set of rows and columns. Each row represents an individual test to perform on the test platform, and each column represents a variable or setting for a respective individual test. The example columns include a 'test name' column 506, a 'test action' column 508, a 'parameters' column 510, a 'positive' column 512 indicating whether the individual test should be performed, a 'run' column 514 showing the exact command that will be executed to perform the test, and a 'report' column 516 indicating whether to report the outcome of the test. These columns are examples. The test composer 118 can incorporate all or part of these columns as well as other types of information relevant to running a test. The field names associated with the columns in the graphical user interface of the test composer 118 are configurable and can be consistent with the XML tag names in the loaded file. The 'positive' column 512 and the 'report' column 516 can be stored as flags in the XML file or in the intermediate representation.

After the file is opened and loaded into the interface, the user can extend, modify, or update the file within the user interface provided with the test composer, as explained below. The user can use the keyboard to enter information in the user interface for certain types of columns, such as the parameters column, can select from a set of available options, such as via a pull-down list or other contextual menu in the test action column, or can select by checking a check box for columns having two states, such as the positive column or the report column. After the test scenario is ready, the user can save the file with 'Save' button 504. The test composer 118 can save the file in XML format or in some other intermediate file format. The XML file can then be passed as an input file to a testing framework for executing the tests on the target test platform.

In one example, the first column of the test composer interface 104 shows a test name 'Create Data Center NFS', a test action 'addDataCenter', and parameters 'name='DataCenterTest', storage_type='e{storage_type} '.' An example XML representation of this information is provided below:

```
<test>
    <test_name>Create Data Center NFS</test_name>
    <test_action>addDataCenter</test_action>
    <parameters>
        <name>DataCenterTest</name>
        <storage_type>e{storage_type}</storage_type>
        ... other parameters ...
    </parameters>
</test>
```

The test composer 118 can provide for several different operations related to creating and updating test scenario files. For example, the user can upload a template file from a testing framework folder or some other file. The user can export or save test composer content to an XML file. The test composer 118 can prompt the user to save the file in a local or network based storage, such as on a server in the provided location.

The user can also insert a row or column to the test scenario depicted in the test composer 118. When adding a column, for example, the user can enter or edit a column header name. The test composer 118 can update the format of the column and data in the column based on a column type indicated by the name or selected by the user. The user can duplicate one or more selected rows or columns, or one or more individual cells. The user can move rows up and down, to rearrange the order the tests will be performed. The user can delete rows or columns. The user can also select a maximum number of rows to display per page. The user can resize columns and rows. Many operations and interac-tions which are associated with spreadsheets can be applied to the user interface of the test composer 118.

The user interface of the test composer 118 can provide tips for assisting users to understand how to input data for controlling tests. For example, when a user clicks on a column header, the user interface can display a wiki or other resource which describes the meaning and possible syntax for data entered in fields under the column. As another example, when a user selects a desired action and hovers the mouse cursor over it, the user interface can display the full documentation supplied with this action, if it exists. When hovering the cursor over a cell, the user interface can display the full cell content, which can be useful when the input text is very long and the cell length is too short to view its full content.

The test composer can provide auto-complete for certain fields. For example, in the run column 314, a user can enter the first character or first few characters of a command, such as 'i' for 'if', 'l' for 'loop', 'y' for 'yes', 'n' for 'no'. Then the system can display all possible values supported for this statement that start with that character, and the user can select from one of the possible values.

FIG. 6 illustrates an example user interface 600 for selecting an action in the test composer 118. In the test action column 606, the user can click on a cell 602. The user interface can present a pop-up menu 604 of available options from which the user can select. The pop-up menu 604 can sort the available options alphabetically, by order of most recently used, by most often selected, or by some other order. When the user selects a particular option from the pop-up menu 604, the test composer 118 can update the remaining cells for that row based on the selected option. It will also present action full description, received parameters and their meaning.

Figure 9:
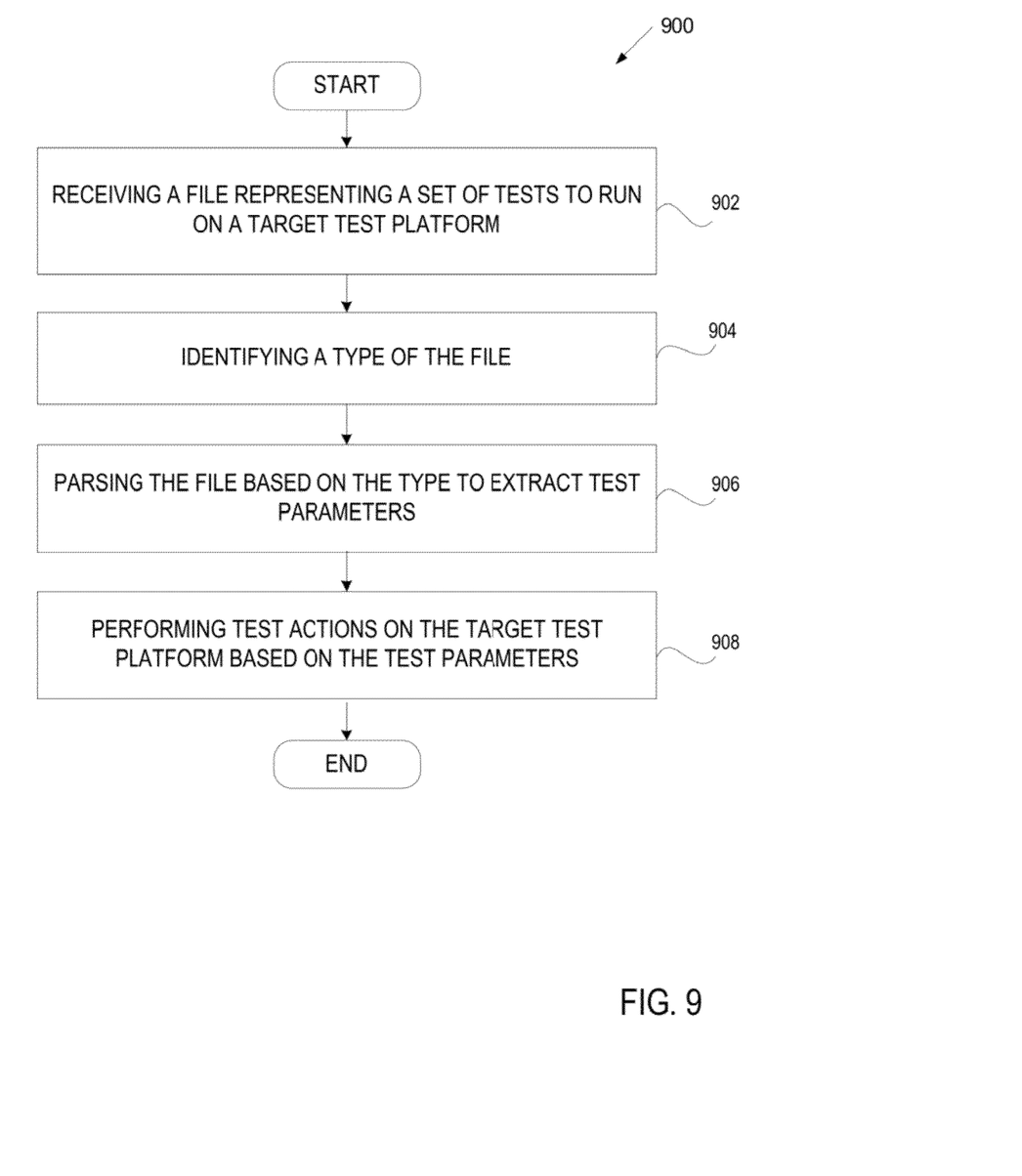
FIG. 9 illustrates an example flow diagram of one embodiment of a method for performing automated tests via a REST API.

FIG. 9 illustrates an example flow diagram of one embodiment of a method 900 for performing automated tests via a REST API. A system configured to practice the method receives a file representing a set of tests to run on a target test platform (902) and identifies a type of the file (904). The file type can be a spreadsheet, an eXtensible Markup Language (XML) file, a script file, or other file type. The system can optionally receive a configuration file which provides additional settings, authorization, credentials, addresses, or other information for carrying out the test actions.

The system parses the file based on the type to extract test parameters (906). The system can identify a plug-in associated with at least one of the type of the file, the set of tests, or the target test platform, and parse the file using the plug-in. The system performs test actions on the target test platform based on the test parameters (908). The test actions can be performed via a REST API accessed via a command line interface or a software development kit interface. Then the system can receive results of the test actions from the target test platform and validate the results.

The system can use the same input file to perform test actions on multiple different platform types. A same input file can be adapted, via various plug-ins, to cause tests to be performed on different platform types such as a computing device running a Linux operating system, a smartphone or other device running Android and its custom Java virtual machine, or a custom embedded platform based on an ARM CPU. The input file specifies high-level test actions and parameters, which the system converts to platform specific commands or groups of commands for each different platform type. For example, the system can identify a second target test platform communicating via a different interface standard from the target test platform, and adapt the test parameters for the different interface standard. Then the system can perform the test actions on the second target test platform based on the test parameters and the different interface standard. For example, the test runner 108 of FIG. 1 can convert the input test file 106 to different sets of test actions 112, each set targeted to a different platform. Then, the test runner 108 can cause each set of test actions to be executed on the appropriate target platform via the respective API engine 114 or other interface. For example, instead of carrying out the test actions via the API engine 114, the test runner 108 can cause commands to be executed via remote shell commands or via some other network based command protocol. While the test actions indicated in the input test file 106 are the same, the actual test actions 112 for each platform may be different, based on the abilities and limitations of each target test platform.

In another embodiment, the system receives an input file representing a set of tests to run on a target test platform, wherein the input file is in a format that is not compatible with the target test platform. The input file can be in a format that is generic and not directly compatible with any target test platform, but that is readable by the test runner 108. The test runner 108 can read and extract data from platform-specific input test files 106 via the appropriate plug-ins, libraries, or translation routines. The system identifies a type of the input file and parses the input file based on the type to extract test parameters. The system adapts the test parameters to an output file that is compatible with the target test platform, and performs test actions on the target test platform using the output file and via a communication channel that is appropriate for the target test platform. The system can optionally receive a configuration file that is separate from the input file, and extract additional test parameters from the configuration file. Then the system can adapt the additional test parameters to the output file.

Figure 10:
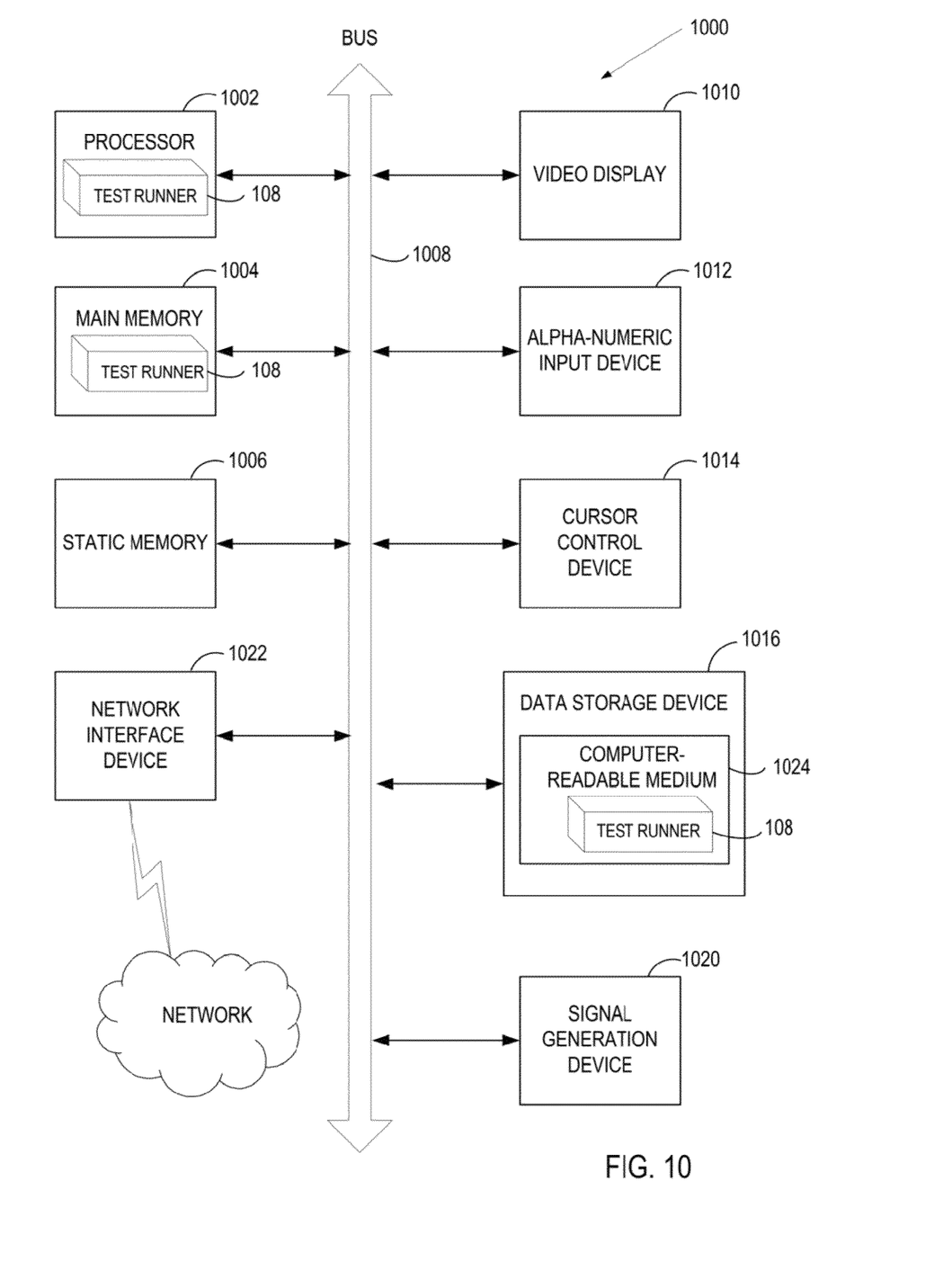
FIG. 10 illustrates a block diagram of an example computer system, in accordance with one embodiment of the present invention.

FIG. 10 illustrates a diagrammatic representation of a machine in the example form of a computer system 1000 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a secondary memory 1018 (e.g., a data storage device), which communicate with each other via a bus 1008.

Processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, processor implementing other instruction sets, or pro-cessors implementing a combination of instruction sets. Processing device 1002 may also be one or more special-purpose processing devices such as an application specific integrated circuit (ASIC), a field programmable gate array (FPGA), a digital signal processor (DSP), network processor, or the like. Processing device 1002 is configured to execute processing logic (e.g., instructions for a test runner 108) for performing the operations and steps discussed herein.

The computer system 1000 may further include a network interface device 1022. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), other user input device such as a touch screen or a microphone, and a signal generation device 1020 (e.g., a speaker).

The secondary memory 1018 may include a machine-readable storage medium (or more specifically a computer-readable storage medium) 1024 on which is stored one or more sets of instructions for the test runner 108 embodying any one or more of the methodologies or functions described herein. The instructions 1026 may also reside, completely or at least partially, within the main memory 1004 or within the processing device 1002 during execution thereof by the computer system 1000, the main memory 1004 and the processing device 1002 also constituting machine-readable storage media.

The computer-readable storage medium 1024 may also be used to store a problem resolution manager which may correspond to the test runner 108 of FIG. 1), or a software library containing methods that call a test runner 108. While the computer-readable storage medium 1024 is shown in an example embodiment to be a single medium, the term "computer-readable storage medium" should be taken to include a single medium or multiple media (e.g., a centralized or distributed database, or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
receiving, by a processing device, a first file representing a set of tests to run on a first target test platform and a second target test platform and a configuration file indicating a test engine of a plurality of test engines, wherein the first target test platform and the second target test platform have different interface standards;
identifying a type of the first file;
parsing, by the processing device, the first file in view of the type to extract test parameters;
adapting the test parameters to an output file that is compatible with the different interface standards of the first target test platform and the second target test platform; and
performing, by the test engine indicated by the configuration file, test actions in parallel on the first target test platform and the second target test platform in view of the test parameters and the different interface standard using a plurality of different communication protocols.

2. The method of claim 1, wherein the test actions are performed via a REpresentational State Transfer (REST) Application Programming Interface (API).

3. The method of claim 1, wherein the first file representing the set of tests comprises one of a spreadsheet, an eXtensible Markup Language (XML) file, or a script file.

4. The method of claim 1, further comprising:
identifying a plug-in associated with at least one of the type of the first file, the set of tests, or at least one of the first target test platform or the second target test platform; and
parsing the first file using the plug-in.

5. The method of claim 1, wherein the test actions are performed on one of the first target test platform or the second target test platform via an application programming interface (API), a command line interface (CLI), or a software development kit (SDK).

6. The method of claim 1, further comprising:
identifying, in the test parameters, a subset of test actions to be performed in parallel on one of the first target test platform or the second target test platform; and
executing at least part of the subset of test actions on the at least one of the first target test platform or the second target test platform simultaneously.

7. A system comprising:
a memory comprising instructions; and
a processing device operatively coupled to the memory, the processing device to execute the instructions to:
receive a first file representing a set of tests to run on a first target test platform and a second target test platform and a configuration file indicating a test engine of a plurality of test engines, wherein the first target test platform and the second target test platform have different interface standards;
identify a type of the first file;
parse the first file in view of the type to extract test parameters;
adapt the test parameters to an output file that is compatible with the different interface standards of the first target test platform and the second target test platform;
perform, by the test engine indicated by the configuration file, test actions in parallel on the first target test platform and the second target test platform in view of the test parameters and the different interface standard using a plurality of different communication protocols.

8. The system of claim 7, the processing device to:
determine an eXtensible Markup Language (XML) format of the first file in view of at least one of a testing framework or one of the first target test platform or the second target test platform.

9. The system of claim 7, wherein the test parameters comprise at least one of a test name, a test action, parameters, a test positive flag, a run flag, or a report flag.

10. The system of claim 7, the processing device to:
receive modified test parameters; and
perform additional test actions on at least one of the first target test platform or the second target test platform in view of the modified test parameters.

11. The system of claim 7 wherein the test actions are performed via a REpresentational State Transfer (REST) Application Programming Interface (API).

12. The system of claim 7, wherein the file representing the set of tests comprises one of a spreadsheet, an eXtensible Markup Language (XML) file, or a script file.

13. The system of claim 7, the processing device to:
identify a plug-in associated with at least one of the type of the first file, the set of tests, or at least one of the first target test platform or the second target test platform; and
parse the first file using the plug-in.

14. The system of claim 7, wherein the test actions are performed on one of the first target test platform or the second target test platform via an application programming interface (API), a command line interface (CLI), or a software development kit (SDK).

15. The system of claim 7, the processing device to:
identify, in the test parameters, a subset of test actions to be performed in parallel on one of the first target test platform or the second target test platform; and
execute at least part of the subset of test actions on the at least one of the first target test platform or the second target test platform simultaneously.

16. A non-transitory computer-readable storage medium comprising instructions which, when executed by a processing device, cause the processing device to:
receive, by the processing device, a first file representing a set of tests to run on a first target test platform and a second target test platform and a configuration file indicating a test engine of a plurality of test engines, wherein the first target test platform and the second target test platform have different interface standards;
identify a type of the first file;
parse the first file in view of the type to extract test parameters;
adapt the test parameters to an output file that is compatible with the different interface standards of the first target test platform and the second target test platform;
perform, by the test engine indicated by the configuration file, test actions in parallel on the first target test platform and the second target test platform in view of the test parameters and the different interface standard using a plurality of different communication protocols.

17. The non-transitory computer-readable storage medium of claim 16, the processing device to:
   extract additional test parameters from the configuration file; and
   adapt the additional test parameters to the output file.

\* \* \* \* \*